Dec. 4, 1934.                L. E. WILLIS                1,983,425
                            GRAPPLING TOOL
                          Filed Sept. 8, 1932
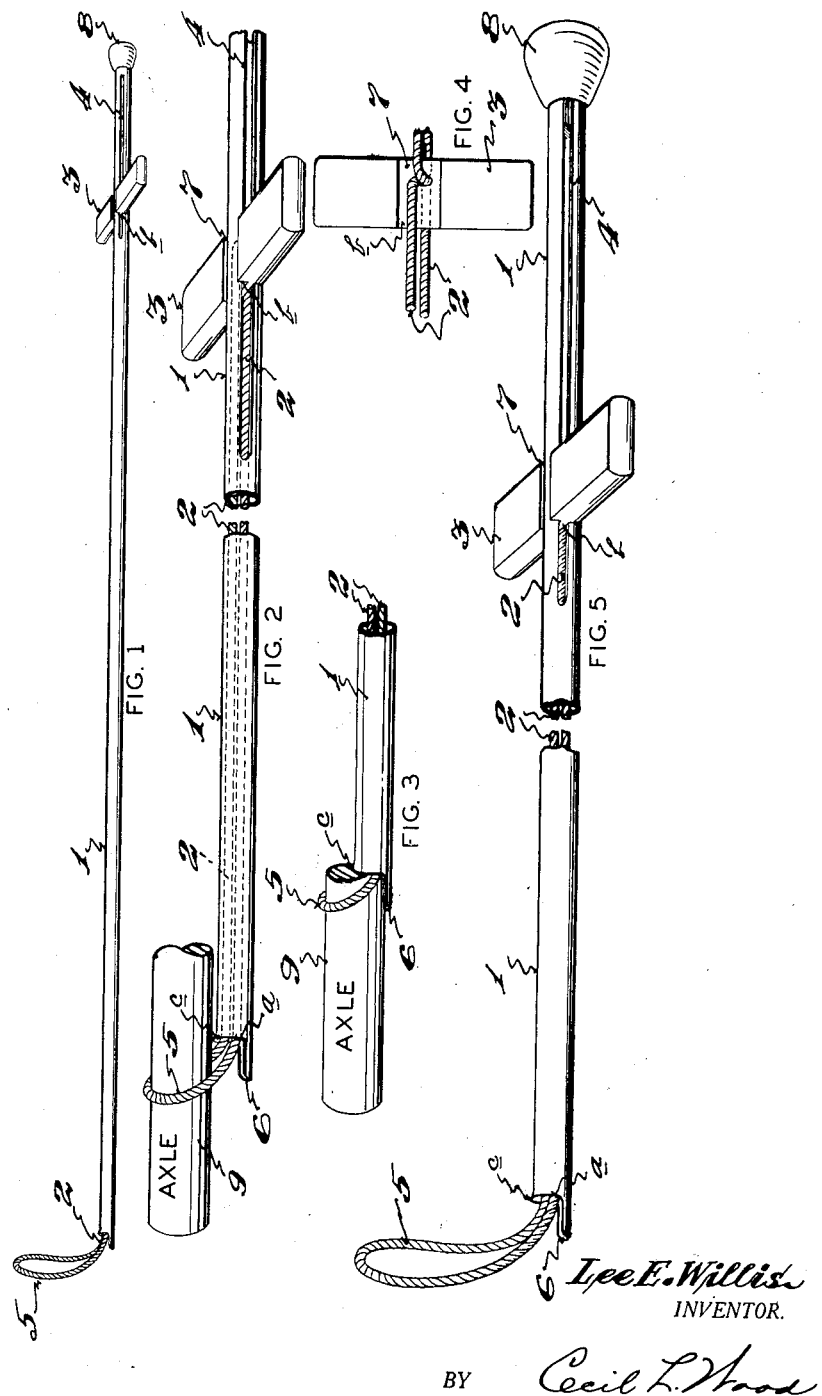
Lee E. Willis
INVENTOR.
BY Cecil L. Wood
ATTORNEY.

Patented Dec. 4, 1934

1,983,425

UNITED STATES PATENT OFFICE 1,983,425

GRAPPLING TOOL

Lee E. Willis, Fort Worth, Tex., assignor of one-fourth to Q. C. McKitham, Fort Worth, Tex.

Application September 8, 1932, Serial No. 632,168

3 Claims. (Cl. 294—100)

This invention relates to grappling tools for retrieving objects from inaccessible places which have become dislodged from their usual support and it has particular reference to implements for effecting the removal of fragments of broken axles from the axle housings of motor vehicles, tools and tubing from oil wells, and many other articles which can not be readily removed from their inaccessible locations and its principal object resides in the provision of a combination of elements calculated to afford a simple yet practical implement constructed in such a manner as to enable its insertion into comparatively small inaccessible passages and grappling or taking hold of articles reposing therein and effecting their removal.

Another object of the invention resides in the provision of an instrument capable of grasping any article which is beyond the reach of the operator affording not only a satisfactory means of grasping and retrieving an inanimate object but capable of use in trapping animals, reptiles and birds.

Broadly, the invention comprehends the provision of an instrument utilitarian in its purposes and capable of many uses but its primary purpose, as above stated is that of retrieving fragments of broken axles from the axle housings of motor vehicles.

While the foregoing objects are paramount, other and lesser objects will become manifest as the description proceeds taken in connection with the appended drawing, wherein:

Figure 1 is a perspective view of the invention in its preferred form.

Figure 2 is an enlarged perspective view of the invention showing the cable loop drawn around a fragment of a broken axle and illustrating the cable operating device and the slot in which the latter operates.

Figure 3 illustrates the manner in which the fragment of axle is grasped by the loop of the cable and held securely in the end of the invention.

Figure 4 is a plan view of the cable operating device showing the manner in which the cable is attached to the same, and Figure 5 is an enlarged perspective view of the invention.

While the illustrations and the drawing show the invention particularly adapted to use as an instrument for retrieving fragments of broken axles, or the like, from axle housings of motor vehicles, it is palpable that the instrument, when constructed according to sufficient proportions, could be used for purposes other than those shown in the drawing. It is to be understood, therefore, that the use of the invention need not be limited to any of the uses above set forth.

Accordingly, the invention is primarily provided with a tubular body 1 through which a cable 2 is extended, the latter being preferably a wire cable, which protrudes from the tubular body 1 at one end, as shown in the drawing herewith, and which is attached, at its opposite end, to a member 3, in the manner shown in Figure 4, which latter is adapted to slide longitudinally of the member 1 in slots 4 near the opposite end of the tubular member 1, as shown in Figures 1, 2 and 5.

As apparent particularly in Figure 5 the open end $a$ of the tubular body member 1, through which the cable 2 extends and forms a loop 5, is provided with an extending lip, or offset tip 6, the purpose of which will be presently described. The end of the tubular member 1 is slightly flared, as shown in Figures 2, 3 and 5, the function of which will also be brought out in the succeeding paragraphs.

It will be noted that the bar or cross member 3 is of such construction as to define a groove 7 which extends laterally across both of its faces thereby lessening its thickness at $b$ in order that it will be adapted to slide in the slots 4, the latter, as previously stated, being horizontally disposed in the tubular member 1, as shown particularly in Figure 5. The member 3, while illustrated as being rectangular in shape and of greater length than width, can be of varying shapes and designs depending upon the use to which the invention may be placed.

It is pointed out also that the slots 4 can be cut from the end of the tubular member 1 down the walls of the latter as far as desired and a handle or knob 8 can be brased or otherwise secured to the end of the tubular member 1, as shown particularly in Figure 5.

In operation, therefore, the end $a$ of the invention is inserted into the axle housing in such a manner as to cause the loop 5 of the cable 2 which protrudes from the tubular member 1, in the manner shown in Figure 5, to pass over the object to be withdrawn from the said housing, such as a fragment of an axle 9, whereupon the member 3, to which the cable 2 is attached, is drawn toward the opposite end of the tubular member 1 thereby causing the loop 5 to tighten itself around the object 9 so that it can be withdrawn from its otherwise inaccessible location.

Figure 2 shows the loop 5 having been loosely passed over a fragment 9 of an axle and illustrates the manner in which the loop 5 can be tightened thereon to securely grasp the axle 9 to effect its removal. The purpose of the projecting or offset tip 6 is more readily understood by reference to Figure 3 in which it is shown supporting the broken end of the axle fragment 9 while the latter abuts the slightly flared end of the tubular member 1 at c where it is slightly indented to afford a greater gripping area and, by reason of the offset tip 6 and the downward thrust of the cable 2, a sufficient grip can be effected on the fragment 9 of the axle to withdraw the latter from the housing (not shown).

It will be seen, therefore, that the loop 5 can be extended to its maximum circumference, as shown in Figures 2 and 5, to permit the latter to be freely passed over the object which is intended to be grasped by it and tightened by urging the member 3, to which the opposite end of the cable 2 is attached, in a direction opposite to the end of the tubular member 1 from which the loop 5 extends.

Two lengths of the cable 2 are loosely disposed within the tubular member 1, as shown in dotted lines in Figure 2, that is to say, the cable 2 being doubled back upon itself and both ends firmly secured to the member 3, as illustrated in Figure 4, the cable 2 being of such length as to extend the full length of the member 1 and out of the end a of the latter sufficiently to afford a liberal loop 5, as previously described.

It is here pointed out that the loop 5 in the cable 2 can be regulated as to its circumference by moving the member 3 in the slots 4 in the tubular member 1. The slots 4 can be made of varying lengths, depending upon the use to which the invention is placed, and obviously their length will govern the extent to which the loop 5 can be expanded.

As previously mentioned, the invention described herein can be readily adapted to use for retrieving lost tools and tubing in oil wells, or the like, when constructed in the necessary proportions. Palpably, it would be necessary to provide a tubular member 1 of such dimensions as will be necessary to handle the operations usually attendant upon such heavy work required in lifting the heavy tools used in oil field operations. Likewise, the cable 2 must be of sufficient strength and the member 3 modified to some extent in order that it can be more readily adapted to the operations just described.

Although the invention has been described with great particularity, it is understood that certain changes and modifications may be resorted to from time to time provided such changes and modifications are deemed within the scope and meaning of the appended claims.

What is claimed is:

1. A grappling tool consisting of a hollow tubular body having a cable operatively disposed therethrough and extending from one end thereof to form a loop, slidable means arranged in the opposite end of the said tubular body to expand and contract the said loop and a projecting offset tip extending from the loop end of the said tubular body.

2. A grappling tool having a tubular body, a cable operatively arranged through the said body and forming a loop at one end thereof capable of expansion and contraction, means to expand and contract the said loop slidably disposed in said body and a projecting offset tip integral with the loop end of the said body.

3. A grappling tool comprising a tubular body having a cable arranged in and through the said body, the said cable forming a contractible and expansible loop at one end of the tubular body, a sliding element arranged through and transversely to the said body capable of operating the said cable through the said body to expand and contract the said loop and an offset tip on the loop end of the said body.

LEE E. WILLIS.